Patented Apr. 16, 1946

2,398,414

UNITED STATES PATENT OFFICE 2,398,414

ORGANIC SELENIUM AND TELLURIUM COMPOUNDS

George H. Denison, Jr., and Paul C. Condit, Berkeley, Calif., assignors, by mesne assignments, to California Research Corporation, San Francisco, Calif., a corporation of Delaware No Drawing. Application February 22, 1943, Serial No. 476,759

7 Claims. (Cl. 260—607)

This invention relates to new and useful compounds of selenium and tellurium.

More particularly, this invention relates to organic selenium and tellurium compounds of the type $$R-(X)_m-R_1$$

wherein R and $R_1$ are like or unlike radicals of alkyl structure at least one of which contains not less than 8 carbon atoms, X is an element selected from the group consisting of selenium and tellurium and $m$ is 1 or 2.

We have prepared such compounds and have found them to be highly useful as additives for mineral lubricating oils, much more so than dialkyl sulfides. Besides their utility as mineral lubricant additives, the compounds of the present invention are useful as antioxidants for vegetable oils, rubber and other organic materials which are subject to oxidative deterioration.

In the representation above, the groups R and $R_1$ (the "alkyl" groups) comprehend not only straight and branched chain saturated groups $C_nH_{2n+1}$, but also straight and branched chain unsaturated aliphatic groups $C_nH_{2n-1}$, $C_nH_{2n-3}$, etc., and also cycloalkyl or cycloaliphatic groups. That is, by "alkyl" as used to identify the groups attached to $-(X)_m-$ in the compositions of the present invention, it is meant to include saturated, unsaturated and cyclic aliphatic groups. R and $R_1$ preferably contain from 8 to 30 carbon atoms, and are preferably like rather than unlike groups. Also, the groups R and $R_1$ may be substituted by aromatic groups, such as the phenyl, hydroxy phenyl and amino phenyl groups, provided such groups are spaced at least one carbon atom from the group $(X)_m$. Polar groups, such as chlorine, bromine, hydroxyl, ether, keto, amino, free carboxyl, metallo carboxyl, carboxy ester, mercapto, mercaptide, mono-, di- and polysulfide, etc., may be substituted in the groups R and $R_1$ of the selenium and tellurium compounds of the present invention. Two or more groups $(X_m)$ may be present in the molecule.

Several preparative methods are available, of which the following, chosen to illustrate the preparation of different types of compounds of the present invention, are examples:

(1) Simple monoselenides such as dicetyl selenide and simple monotellurides such as dicetyl telluride may be prepared by reacting sodium selenide or telluride with an alkyl halide, such as a cetyl chloride, in an inert solvent such as ethyl alcohol, in accordance with the chemical equation $$2RCl + Na_2X \rightarrow R-X-R + 2NaCl$$

wherein X=Se or Te. Solvent is removed by evaporation and the product is washed free of sodium halide. It may be further purified by recrystallization from a suitable solvent, such as petroleum ether, or by distillation.

(2) Mixed monoselenides such as methyl cetyl selenide and mixed monotellurides such as methyl cetyl telluride may be prepared by carrying the above reaction only to the point of forming a seleno mercaptide or a telluro mercaptide $$RI + Na_2X \rightarrow R-X-Na + NaI$$

and reacting the resulting mercaptide with an equivalent amount of a different alkyl halide $$R-X-Na + R_1I \rightarrow R-X-R_1 + NaI$$

(3) Diselenides ($R-Se_2-R_1$) and ditellurides ($R-Te_2-R_1$) may be prepared by careful oxidation of the corresponding seleno and telluro mercaptans $$2R-Se-H + O \rightarrow R-Se-Se-R + H_2O$$
$$2R-Te-H + O \rightarrow R-Te-Te-R + H_2O$$

but a more practical method, we have discovered, comprises a series of reactions believed to occur as follows, using selenium for the purpose of illustration:

(a) $\quad MCN + Se \longrightarrow MSeCN$ (b) $\quad RX + MSeCN \longrightarrow RSeCN + MX$ (c) $\quad 2RSeCN \xrightarrow{NaOH} R-Se_2-R + (CN)_2$ Reaction (c) may, however, occur in a manner other than that indicated, as follows:

(c')

$$3RSeCN + 4NaOH \longrightarrow R-Se_2-R + RSeO_2Na + 3NaCN + 2H_2O$$

In Equations (a) to (c'), M represents an alkali metal, preferably potassium, R represents an alkyl group as herein defined, and X represents a replaceable negative atom or radical, preferably chlorine. In carrying out this process, reaction (a) may be carried out in aqueous solution, reaction (b) may be carried out in ethyl alcohol, and reaction (c) may be carried out by reacting the alkyl selenocyanate with caustic alkali in aqueous alcohol. This method does not yield as desirable a product, from the standpoint of lubricant additives, with chlorinated wax as it yields with some of the lower, purer alkyl chlorides, such as lauryl chloride and cetyl chloride.

(4) A practical way of making a mixture of selenium and tellurium compounds including polyselenides or polytellurides as well as monoselenides or monotellurides comprises dissolving selenium or tellurium in strong aqueous or alcoholic caustic soda or caustic potash solution and heating the resulting mixture with a halogenated hydrocarbon such as lauryl chloride or a halogenated mixture of hydrocarbons such as chlorinated paraffin wax.

The following specific examples will serve to illustrate the preparation and properties of the compositions of the invention:

*Example 1.*—Dicetyl selenide $$(C_{16}H_{33}-Se-C_{16}H_{33})$$

was prepared stepwise as follows: In the first step, represented by the equation $$2Na + Se \rightarrow Na_2Se$$

sodium selenide was produced by reacting sodium and selenium in stoichiometric amounts in liquid ammonia and in the presence of an inert atmosphere (nitrogen). In the second step, represented by the equation $$2C_{16}H_{33}Cl + Na_2Se \rightarrow C_{16}H_{33}-Se-C_{16}H_{33} + 2NaCl$$

normal cetyl chloride was condensed with the sodium selenide in alcohol solution, also in an atmosphere of nitrogen. In both steps, after the reaction, solvent was removed by evaporation. The product of step 2 was washed free of NaCl with water, and the crude selenide so obtained was observed to stain copper metal black. This tendency can be destroyed and the selenide purified by heating the selenide with copper metal in an inert atmosphere and recrystallizing from petroleum ether in the presence of decolorizing charcoal. However, it has been found that the effect of the dialkyl selenides of the invention in blackening copper is of relatively little significance in practice; hence, the crude product, washed free of NaCl, may be used.

The pure dicetyl selenide is a white, waxy odorless solid crystallizing in small lustrous plates and melting at 123–125° F. It is very soluble in most hydrocarbon solvents, for example petroleum ether, and it is practically insoluble in water and alcohol. These solubility properties are valuable from the standpoint of a lubricant additive since high solubility in hydrocarbon solvents and low solubility in water, together with the low volatility of the selenide, render it sufficiently soluble in mineral oils and insufficiently soluble in water to enable the refiner to provide an adequate reserve of selenide in an oil without danger of its being leached out by water or lost through vaporization at elevated temperatures.

*Example 2.*—Dicetyl telluride $$(C_{16}H_{33}-Te-C_{16}H_{33})$$

was prepared in the same manner as dicetyl selenide in Example 1, except that tellurium was substituted for selenium in chemically equivalent amount. It was also found advantageous to isolate the telluride after the second step (condensation of cetyl chloride with sodium telluride) by chilling the alcoholic solution and filtering and then extracting the residue with petroleum ether and evaporating the petroleum ether. Purification by copper treatment was also employed for final purification.

The telluride so prepared consisted of white odorless crystals, melting point 43° to 44.5° C.

*Example 3.*—Bis (chlorocetyl) selenide and bis (hydroxycetyl) selenide were prepared as follows: 7.9 grams of selenium were suspended in about 100 cc. of dry benzene and chlorine was then bubbled through the suspension while the latter was stirred vigorously and cooled occasionally. The chlorine was taken up rapidly and a yellow powder precipitated. When chlorine was no longer taken up the solution was blown with dry nitrogen until free of chlorine. 50 grams (about 10% excess) of cetene-1 was added from a dropping funnel. The mixture heated up and the precipitate disappeared to give an almost colorless solution. 19 grams of sodium metabisulfite ($Na_2S_2O_5$) in about 100 cc. of water were added and stirring was continued for about 20 minutes. The white solution turned yellow and a little selenium precipitated; this could be avoided by adding a little less sodium meta-bisulfite and stirring for a shorter time. The benzene layer was separated and the aqueous layer was extracted with benzene and the combined benzene layer and extract were washed with water and dried over sodium sulfate. Solvent was removed by distillation, leaving a dark oil.

This product was the desired bis (chlorocetyl) selenide. It was believed to be bis ($\beta$-chlorocetyl) selenide and to have the structural formula $$C_{14}H_{29}.CH.CH_2-Se-CH_2.CH.C_{14}H_{29}$$
$$\quad\quad\ \ \ |\quad\quad\quad\quad\quad\quad\ \ |$$
$$\quad\quad\ \ Cl\quad\quad\quad\quad\quad\quad Cl$$

However, alternative structures may be assigned to the product as follows:

$$\begin{matrix}CH_2.Cl & CH_2.Cl\\ | & |\\ C_{14}H_{29}.CH-Se-CH.C_{14}H_{29}\end{matrix}$$

$$\begin{matrix}CH_2.Cl & & Cl\\ | & & |\\ C_{14}H_{29}.CH-Se-CH_2-CH.C_{14}H_{29}\end{matrix}$$

The product, except for small amounts of impurities, may have consisted of any one or more of the above three compounds. The product as obtained was a reddish yellow oil and had a slight but not unpleasant odor.

Bis (hydroxycetyl) selenide was prepared by refluxing the above described bis (chlorocetyl) selenide with water for 1.5 hours, extracting the oil with ether, drying the ether extract over sodium sulfate and evaporating the ether. The product, a red oil, gave a strong qualitative test for selenium and only a slight indication of chlorine. The aqueous portion of the refluxed material contained a great deal of HCl. The product was believed to have the following structure:

$$C_{14}H_{29}.CH.CH_2-Se-CH_2.CH.C_{14}H_{29}$$
$$\quad\quad\ \ \ |\quad\quad\quad\quad\quad\quad\ \ |$$
$$\quad\quad\ \ OH\quad\quad\quad\quad\quad\quad OH$$

but it may have had a structure corresponding to the alternative chloro compounds indicated above, the chlorines being replaced by hydroxyl groups.

*Example 4.*—Dilauryl diselenide $$(C_{12}H_{25}-(Se)_2-C_{12}H_{25})$$

was prepared as follows: 10 grams of lauryl selenocyanate ($C_{12}H_{25}SeCN$) were dissolved in 25 cc. of alcohol and the solution was cooled at 32° F. Two cc. of 50% aqueous NaOH were diluted with 10 cc. alcohol and similarly cooled. On mixing the two a clear solution resulted which, however, began to deposit a solid in about 10 seconds and the solution then set to a solid. An additional 25 cc. of alcohol were stirred in and the mixture was allowed to stand at 40° F. for 2 hours. It was then poured into water and the oil that separated was extracted with ethyl ether. The ethyl ether extract was washed with water and dried over sodium sulfate and the ether removed by evaporation. The residue was crystallized from a cold mixture of ether and alcohol. The resulting product consisted of fine, pale yellow plates melting at about 21° C.

*Example 5.*—Dilauryl selenoxide

($C_{12}H_{25}$—(SeO)—$C_{12}H_{25}$)

was prepared as follows: 50 grams of dilauryl selenide were allowed to stand for three days with an ethyl ether solution of exactly the equivalent amount of monoperphthalic acid. The ether was then removed under reduced pressure with very gentle warming. The product was taken up in about 400 cc. of cold chloroform used in three portions and then filtered and saturated in the cold with ammonia gas. It was then filtered once through Super-Cel and then through filter paper and washed with chloroform saturated with ammonia. Almost all of the chloroform was then removed under reduced pressure by very gentle warming. The pasty residue was triturated with 500 cc. of cold ethyl ether, filtered and dried on the filter. The product was a white powder melting at 81° C. with decomposition to give selenium.

*Example 6.*—Dilauryl selenone

($C_{12}H_{25}$—(SeO$_2$)—$C_{12}H_{25}$)

was prepared as follows: 20 grams of dilauryl selenide were diluted to 51 cc. with ethyl ether and mixed with 510 cc. of an ether solution of perphthalic acid of a strength such that 1000 cc. of said ether solution of perphthalic acid was equivalent to 20.9 cc. of .1006 N sodium thiosulfate. After the mixture had stood overnight the ether was removed under reduced pressure on a steam bath. The residue was extracted with 250 cc. of boiling chloroform used in three portions. The chloroform was removed under reduced pressure on a steam bath and the residue was crystallized in 100 cc. of absolute alcohol. The resulting white crystals were air-dried over night. The dry product melted at 104.5° to 106° C. and decomposed rapidly at 145° to 150° C.

*Example 7.*—"Diparaffin selenide" was prepared in a manner similar to the preparation of dicetyl selenide set forth in Example 1, except that cetyl chloride was replaced by chlorinated wax. 300 grams of chlorinated wax (25.7% Cl) were thus reacted with sodium selenide resulting from the reaction of 51 grams of sodium with 87.5 grams of selenium. The product was a dark viscous oil containing 18.9% of selenium and 10.1% of chlorine.

Further examples of compositions of matter within the scope of the present invention are decyl methyl monoselenide, cetyl ethyl monoselenide, octyl decyl monoselenide, di-eicosyl monoselenide; dioctyl diselenide, didecyl diselenide, diheptadecyl diselenide, di-eicosyl diselenide; decyl methyl monotelluride, cetyl ethyl monotelluride, octyl decyl monotelluride, didecyl monotelluride, diundecyl monotelluride, dilauryl monotelluride, ditetradecyl monotelluride, dicetyl monotelluride, diheptadecyl monotelluride, di-eicosyl monotelluride; dioctyl ditelluride, didecyl ditelluride, dilauryl ditelluride, dicetyl ditelluride; the various mono- and polyselenides and mono- and polytellurides prepared by reacting sodium or other alkali metal mono- or polyselenides or mono- or polytellurides with halogenated, e. g., chlorinated hydrocarbons, such as decyl chloride, dodecyl chloride, tetradecyl chloride, cetyl chloride, heptadecyl chloride, eicosyl chloride, chlorinated lubricating oil and chlorinated wax; the selenoxides and selenones prepared by substituting dioctyl selenide, didecyl selenide or dicetyl selenide for dilauryl selenide in the procedures of Examples 5 and 6, respectively.

*Example 8.*—A highly refined S. A. E. 30 Western oil and the same oil compounded with various inhibitors (both of the invention and not of the invention) were submitted to oxidation at 340° F. in an apparatus of the type described by Dornte in Industrial and Engineering Chemistry, vol. 28, page 26 (1936), oxygen being absorbed by the oil under test at 340° F. The results are set forth in Tables I and II below. In these tables the time is given in hours for the absorption of the indicated number of cubic centimeters of oxygen (S. T. P.) by 100 grams of oil. Except where otherwise indicated, the additive was dissolved in the oil in the amount of 0.1% by weight. The dilauryl selenoxide, being substantially insoluble, was suspended in the oil.

*Table I*

| Time, hrs. | Nil | Oxygen absorbed by base oil plus— | | | | | | |
|---|---|---|---|---|---|---|---|---|
| | | Dicetyl sulfide | Diphenyl selenide | Cetylphenyl selenide | Dibenzyl selenide | Dicetyl selenide | Dilauryl diselenide | Didecyl selenide |
| 0.05 | 33 | | | | | | | |
| 0.15 | | 20 | 0 | | | | | |
| 0.20 | 96 | | | | | | | |
| 0.25 | 522 | | | | | | | |
| 0.30 | 1,746 | | 458 | | | | | |
| 0.32 | | | | 728 | | | | |
| 0.35 | | 506 | 1,048 | 1,456 | | | | |
| 0.40 | | 1,380 | | 3,022 | | | | |
| 0.45 | | 2,436 | | | | | | |
| 0.50 | | | 1,706 | | | 0 | | |
| 1.00 | | | | | | 0 | | 0 |
| 1.40 | | | | | 630 | | | |
| 1.50 | | | | | | | 0 | |
| 1.55 | | | | | 4,012 | | | |
| 2.00 | | | | | | | | 0 |
| 2.50 | | | | | | | 21 | |
| 2.60 | | | | | | 174 | | |
| 2.90 | | | | | | 1,460 | | |
| 3.00 | | | | | | | | 44 |
| 3.50 | | | | | | | 40 | |
| 4.00 | | | | | | | | 152 |
| 4.30 | | | | | | | | 571 |
| 4.40 | | | | | | | 117 | 1,906 |
| 4.50 | | | | | | | 207 | |
| 4.90 | | | | | | | 850 | |
| 5.10 | | | | | | | | |

Table II

| Time, h | Oxygen absorbed by base oil plus— | | | | |
|---|---|---|---|---|---|
| | Diparaffin selenide | Dicetyl telluride | Bis (β-chlorocetyl) selenide (0.15%) | Bis (β-hydroxycetyl) selenide (0.135%) | Dilauryl selenoxide |
| 0.25 | | | | | |
| 0.40 | | 0 | | | |
| 0.50 | | | | 0 | |
| 0.70 | | | | | 0 |
| 1.00 | | | 22 | | |
| 1.35 | | 0 | | 40 | 28 |
| 1.40 | | 0 | | 86 | |
| 1.50 | | | 101 | | |
| 1.60 | | | | | 56 |
| 1.65 | | | | 180 | |
| 1.75 | | 37 | 484 | | |
| 1.78 | | 272 | | 800 | |
| 2.00 | 44 | | | | |
| 2.20 | | | | | 194 |
| 3.30 | 67 | | | | 2,748 |
| 3.50 | 1,590 | | | | |

*Example 9.*—A Western S. A. E. 60 aviation oil, with and without compounding agents, was submitted to test in a Lauson gasoline engine. The test was carried out as follows: A single cylinder Lauson gasoline spark ignition engine, 2⅝ inch bore and 2½ inch stroke, loaded with a three-phase induction generator, was operated under extremely severe conditions designed to develop fully the tendency of the crankcase lubricant to deteriorate with gum formation and piston ring sticking. The engine was operated at 1200 revolutions per minute, the engine jacket temperature was maintained at 460° F., the crankcase oil temperature was maintained at 220° F. and the engine was operated for 30 hours after which the piston condition and the neutralization number of the used oil were determined. Results are set forth in Table III below:

Table III

| Additives | P. D. No.[1] | Per cent ring slot carbon | Ring condition | Neut. No. of used oil |
|---|---|---|---|---|
| (1) None | 455 | 40 | Stuck | 1.30 |
| (2) 1.5% dicetyl selenide | 515 | 100 | Free | 0.24 |
| (3) 0.375% sulfurized Ca cetyl phenate+0.125% Ca cetyl phosphate | 200 | 60 | Stuck | 1.52 |
| (4) Same compounding as (3)+0.5% dicetyl selenide | 115 | 0 | Free | 0.23 |
| (5) Same compounding as (3)+1.0% dilauryl selenide | 70 | 0 | ...do | 0.83 |

[1] P. D. No. (Piston Discoloration No.) as used in the table above involves a careful inspection of the piston skirt and an estimate of the percentage of the skirt covered with black, dark brown or light brown gum. On the scale chosen a completely black piston is assigned a P. D. No. of 800 and a piston completely free from discoloration is assigned a P. D. No. of 0. Black gum on the piston skirt is estimated as being four times as detrimental to engine performance as light brown gum and a heavy deposit of black gum was in many cases observed to be the forerunner of piston seizure.

This application is a continuation-in-part of our copending application Serial No. 432,040, filed February 23, 1942.

We claim:

1. A compound of the type $$R-(X)_m-R_1$$

wherein R and $R_1$ are like aliphatic radicals each containing not less than 10 carbon atoms, X is an element selected from the group consisting of selenium and tellurium, and $m$ is an integer from 1 to 2.

2. The compound of claim 1 wherein X is selenium.

3. The compound of claim 1 wherein X is tellurium.

4. Compounds of the type $$R-(X)_m-R_1$$

wherein R and $R_1$ are like aliphatic radicals containing from 10 to 30 carbon atoms, X is an element selected from the group consisting of selenium and tellurium, and $m$ is an integer from 1 to 2.

5. Compounds of claim 4 wherein X is selenium.

6. Di-decyl selenide.

7. Dilauryl selenide.

GEORGE H. DENISON, Jr.
PAUL C. CONDIT.